United States Patent [19]
Ikegami et al.

[11] 4,204,496
[45] May 27, 1980

[54] STEEL-PIPE COATING APPARATUS

[75] Inventors: Yoshio Ikegami, Miki; Tadashi Kohge, Kobe; Masakatsu Kawahara, Amagasaki; Hirofumi Kimura, Kobe, all of Japan

[73] Assignee: Kobe Steel, Limited, Kobe, Japan

[21] Appl. No.: 822,321

[22] Filed: Aug. 5, 1977

[30] Foreign Application Priority Data

Nov. 8, 1976 [JP] Japan .............................. 51-134315
Nov. 8, 1976 [JP] Japan .............................. 51-134316
May 4, 1977 [JP] Japan .............................. 52-51378

[51] Int. Cl.² .............................................. B05C 5/02
[52] U.S. Cl. .................................... 118/405; 425/113; 425/381; 425/465
[58] Field of Search ............... 118/404, 405, DIG. 18, 118/DIG. 11; 425/76, 376 R, 113, 465, 381; 264/167; 427/356, 358

[56] References Cited

U.S. PATENT DOCUMENTS

| | | | |
|---|---|---|---|
| 2,892,441 | 6/1959 | Stearns | 118/DIG. 11 |
| 3,690,288 | 9/1972 | Main et al. | 118/405 X |
| 3,692,447 | 9/1972 | Nelson | 425/113 |
| 4,082,585 | 4/1978 | Kanotz et al. | 425/113 X |

FOREIGN PATENT DOCUMENTS 47-39576 10/1972 Japan .

Primary Examiner—John P. McIntosh
Attorney, Agent, or Firm—Oblon, Fisher, Spivak, McClelland & Maier

[57] ABSTRACT

A steel-pipe coating process and an apparatus therefor, in which molten resin is extruded through a cross-head die connected to an extruder, into a tubular shape, in a manner to cover or coat the surface of a steel pipe. In this apparatus, a resin outlet in the extruder is communicated through the medium of a resin guide member with a resin inlet of the cross head die. The extruder is secured to a fixed frame, while the cross head die is supported by the fixed frame in a reciprocating manner through the medium of a reciprocating drive member within a given stroke in the direction of the steel pipe being fed. Thus, when the cross head die is reciprocated by means of the reciprocating drive member, the relative speed of the steel pipe being fed to the cross head die being reciprocated may be intermittently varied, whereby the amount of resin being extruded through a cylindrical outlet of the cross head die around the surface of the steel pipe may be intermittently varied.

10 Claims, 10 Drawing Figures

STEEL-PIPE COATING APPARATUS

BACKGROUND OF THE INVENTION

1. Field of the Invention

This invention relates to a steel-pipe coating process and an apparatus therefor, in which molten resin is extruded through a cross head die connected to an extruder, into a tubular shape, in a manner to cover the outer surface of a steel pipe, and more particularly to a process and an apparatus in which the amount of resin being extruded through a cylindrical outlet in the cross head die around the surface of the steel pipe may be intermittently varied, thereby forming joints or nodes in the resin coating covering the surface of the steel pipe.

2. Description of the prior art

Hitherto, many attempts have been proposed for forming joints or nodes, i.e., annular ribs on a resin coating covering the surface of a steel pipe, thus presenting a bamboo-like appearance. These attempts are characterized by:

(a) a process for coating the surface of a steel pipe by using a cross head die in an extruder, in which the feeding of a steel pipe is intermittently interrupted, so that resin being fed from the cross head die is intermittently built up in specific positions around the surface of the steel pipe, thereby forming annular ribs therearound;

(b) a process, in which an extruder and a cross head die are of one body and the extruder and the cross head die are jointly reciprocated within a given stroke and the relative speed of the extruder, as well as the cross head die, to the steel pipe being fed is intermittently varied so as to form annular ribs around the surface of the pipe; and (c) a process, in which there are provided a main extruder for extruding resin for use in coating and an auxiliary extruder for extruding resin to form ribs.

However, according to process (a), the feeding of a steel pipe is intermittently interrupted, thus failing to form a coated steel pipe continuously so that process (a) is locking in efficiency and not adapted for mass production.

According to process (b), an extruder and a cross head die are jointly reciprocated, thus dictating the use of a large scale apparatus with the accompanying increase in power required therefor as well as in installation cost. According to the process (c), two extruders are required resulting in an increase in scale of the apparatus and increased installation cost.

SUMMARY OF THE INVENTION

It is accordingly an object of the present invention to provide a steel-pipe coating process and an apparatus which may avoid the shortcomings encountered with the prior art processes and apparatuses by providing a simple apparatus which provides for improved efficiency in coating with resin of the surface of a steel pipe which is being fed continuously, as well as in forming annular ribs on the resin coating in specific positions around the steel pipe.

According to a first aspect of the present invention, there is provided a steel-pipe coating apparatus using an extruder and a cross head die, in which an extruder is communicated through the medium of a resin guide member with a cross head die, and the cross head die alone is reciprocated with the extruder being maintained stationary, thereby intermittently varying the relative speed of the steel pipe being fed to the cross head die being reciprocated, so that the amount of resin being fed through the cross die head is intermittently varied. As a result, annular ribs may be formed at a given pitch on a resin coating covering the outer surface of the steel pipe.

According to a second aspect of the present invention, there is provided a steel-pipe coating apparatus, as defined in the first aspect of the invention, in which the resin guide member is a hose or the like having a desired flexibility.

According to a third aspect of the present invention, there is provided a steel-pipe coating apparatus as defined in the first aspect of the invention, in which the resin guide member is an expansion-and-universal joint affording suitable expansibility.

According to the fourth aspect of the present invention, there is provided a steel-pipe coating apparatus as defined in the first aspect of the invention, in which the resin guide member includes an adapter communicated with a resin outlet in an extruder, and annular member which is fitted in and supported by the cross head die in slidable relation.

According to a fifth aspect of the present invention, there is provided a steel-pipe coating apparatus as defined in the first through fourth aspects of the invention, in which the reciprocating drive means for reciprocating a cross head die has a mechanism, such as a brake and a clutch, for temporarily interrupting the aforesaid reciprocating movements of the cross head die.

BRIEF DESCRIPTION OF THE DRAWINGS

Various other objects, features and attendant advantages of the present invention will be more fully appreciated as the same becomes better understood from the following detailed description of the present invention when considered in connection with the accompanying drawings, in which.

DESCRIPTION OF THE PREFERRED EMBODIMENTS

Figure 1:
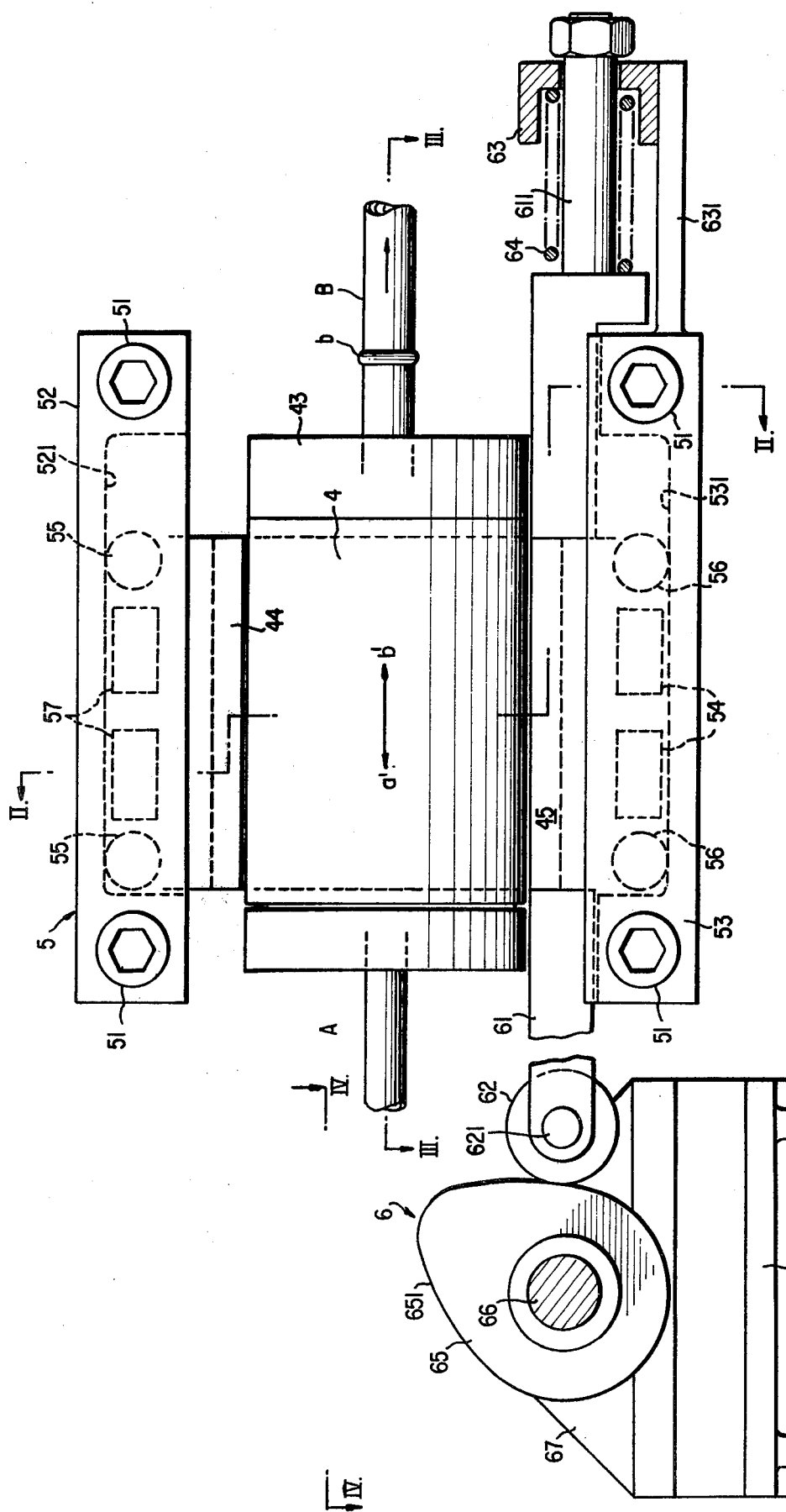
FIG. 1 is a front view of one embodiment of the present invention.
Figure 2:
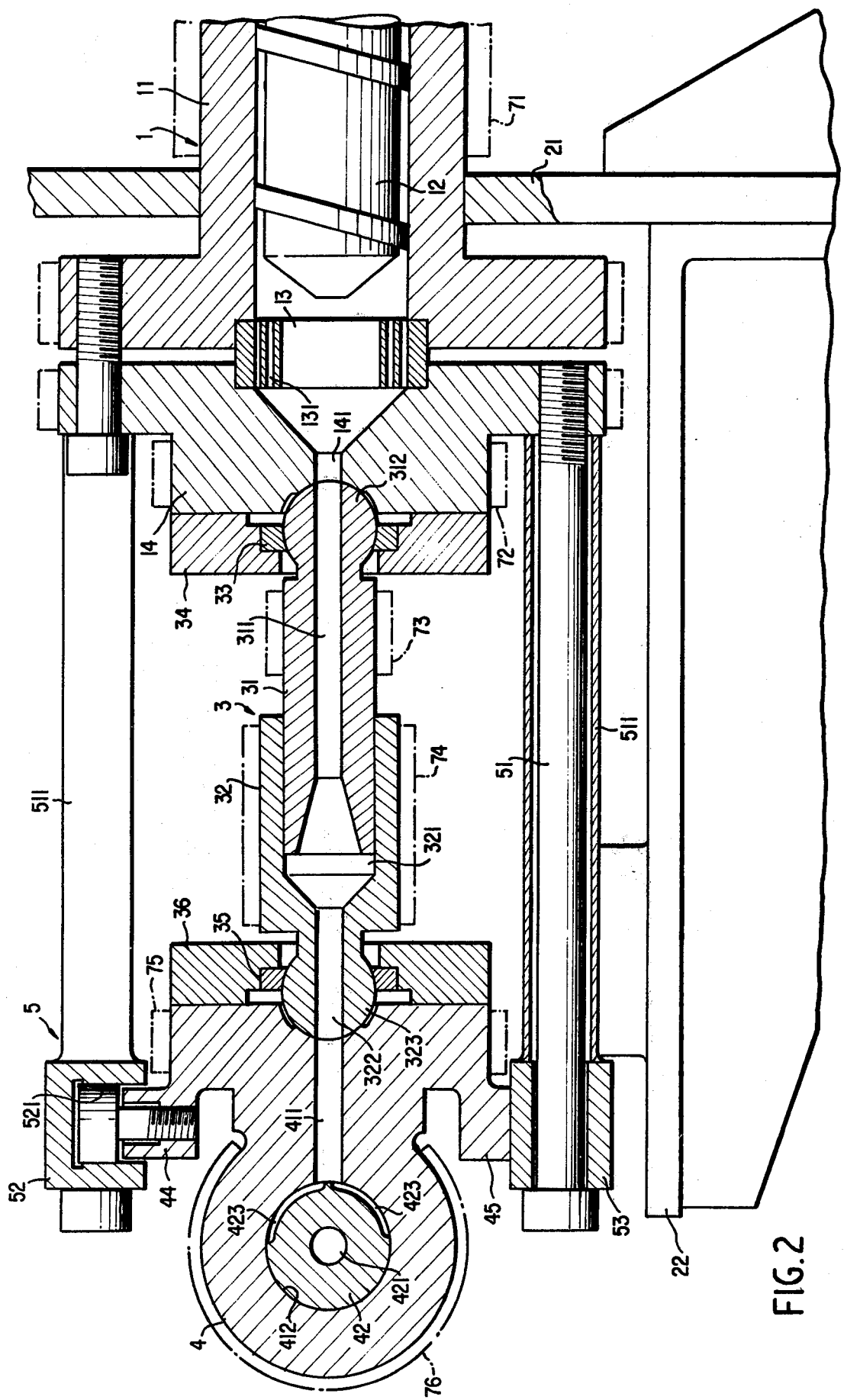
FIG. 2 is a longitudinal cross-sectional view taken along the line II—II of FIG. 1.
Figure 3:
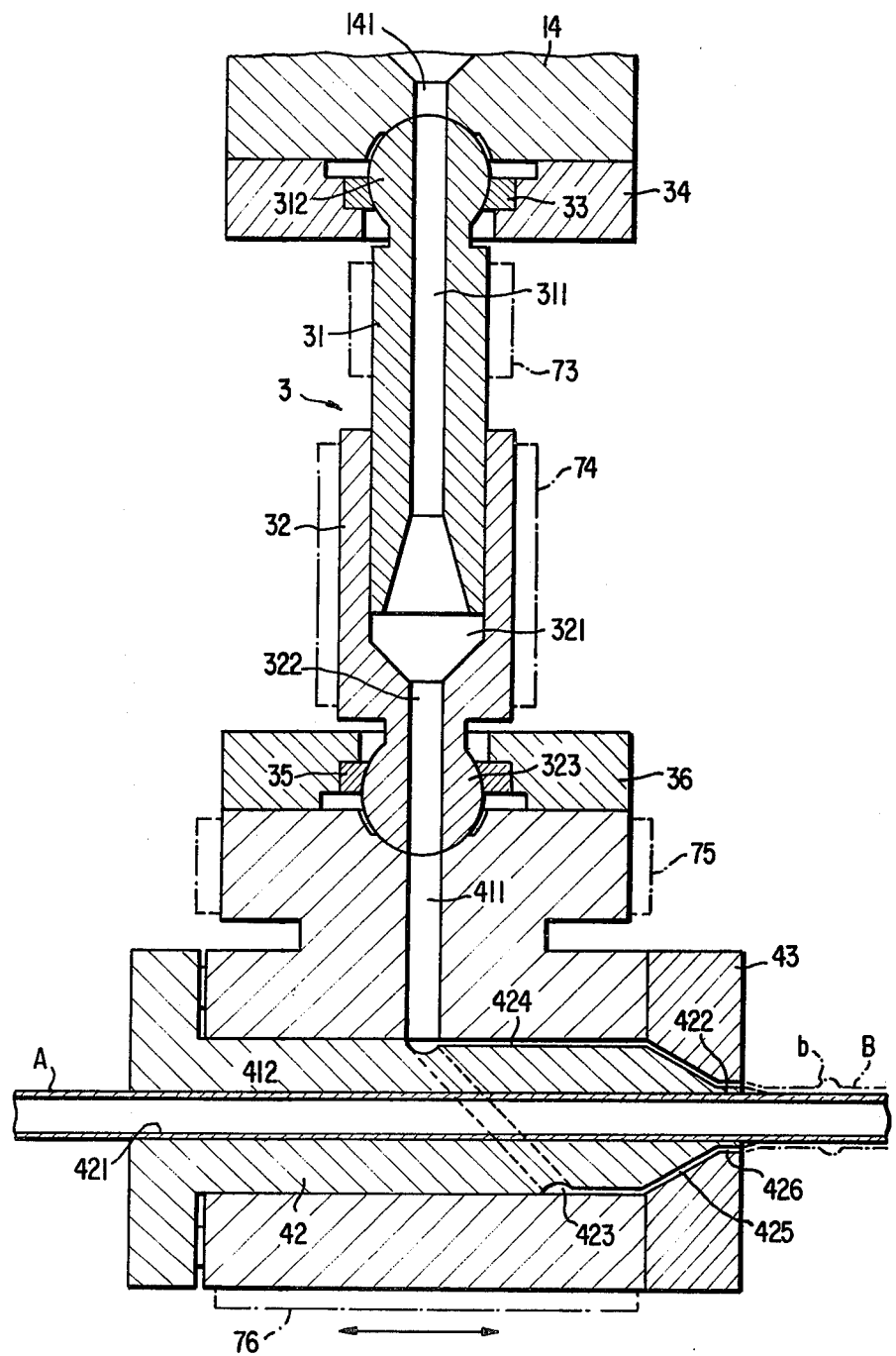
FIG. 3 is a horizontal, partially cross sectional view thereof taken along line III—III of FIG. 1.
Figure 4:
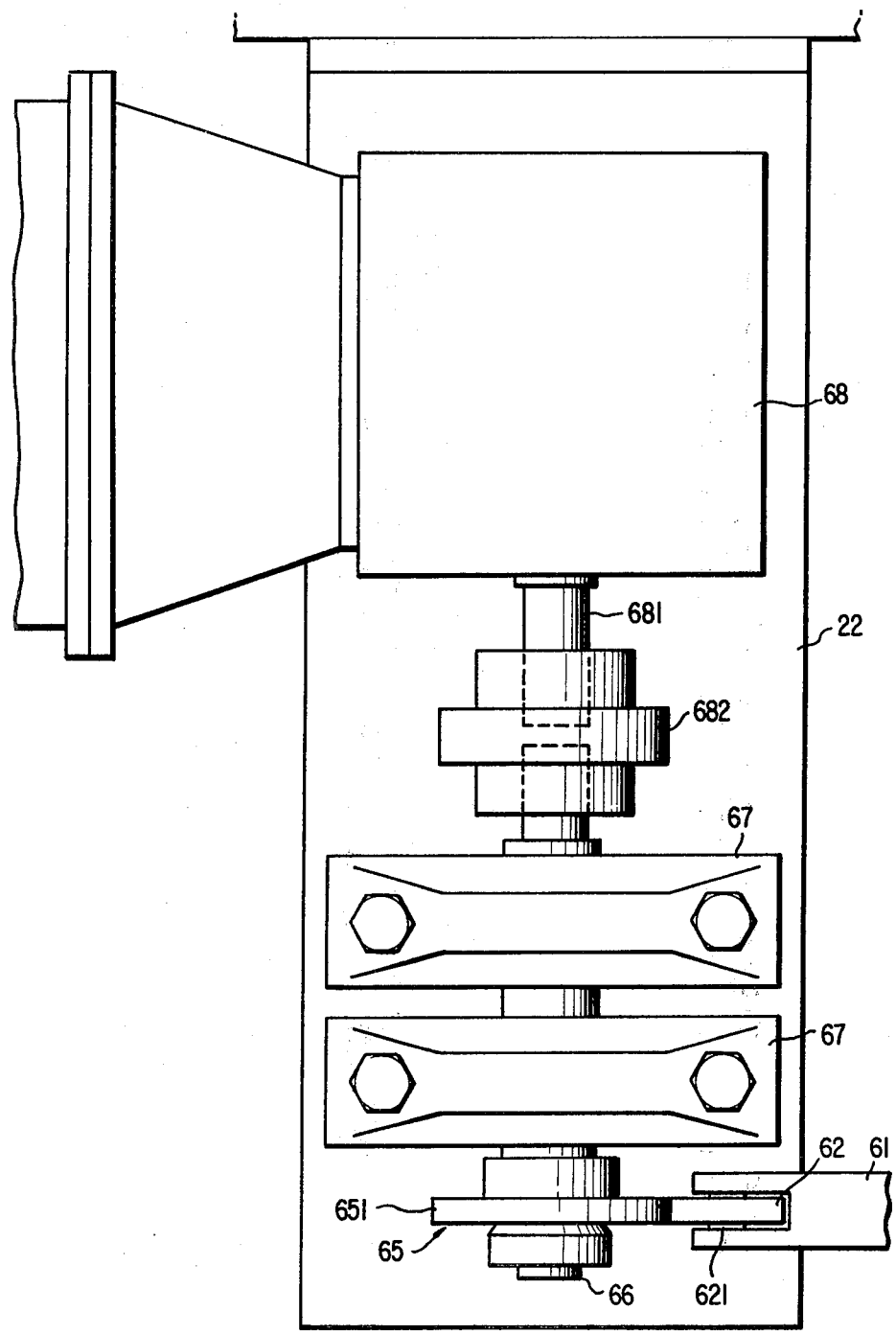
FIG. 4 is a plan view of a reciprocating drive means taken along line IV—IV of FIG. 1.

One embodiment of the invention will now be described in more detail with reference to FIGS. 1 to 6. Shown at 1 is an extruder for use in supplying a coating resin B, and the extruder 1 is supported on a fixed frame 21 rigidly. Shown at 11 is a cylinder in the extruder and at 12 a screw. An adapter 14 is secured to the end of cylinder 11 through the medium of a breakerplate 13 having a plurality of through-holes 131. Shown at 3 is an expansion and universal joint serving as a resin guide member which brings a resin extruding outlet 141 provided in the adapter 14 into communication with a resin inlet 411 provided in the cross head die 4.

Figure 6A:
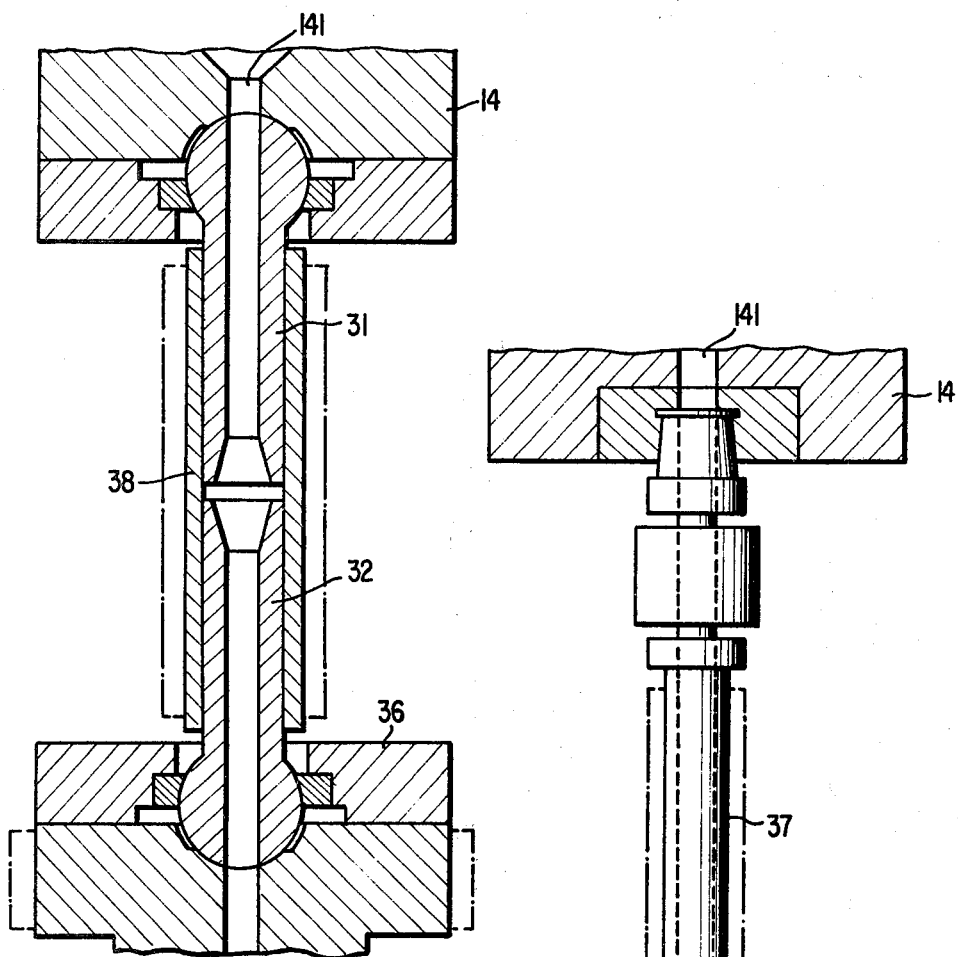
FIGS. 6A, 6B, 7 and 8 are horizontal cross-sectional views of another embodiment of a resin guide member.
Figure 6B:
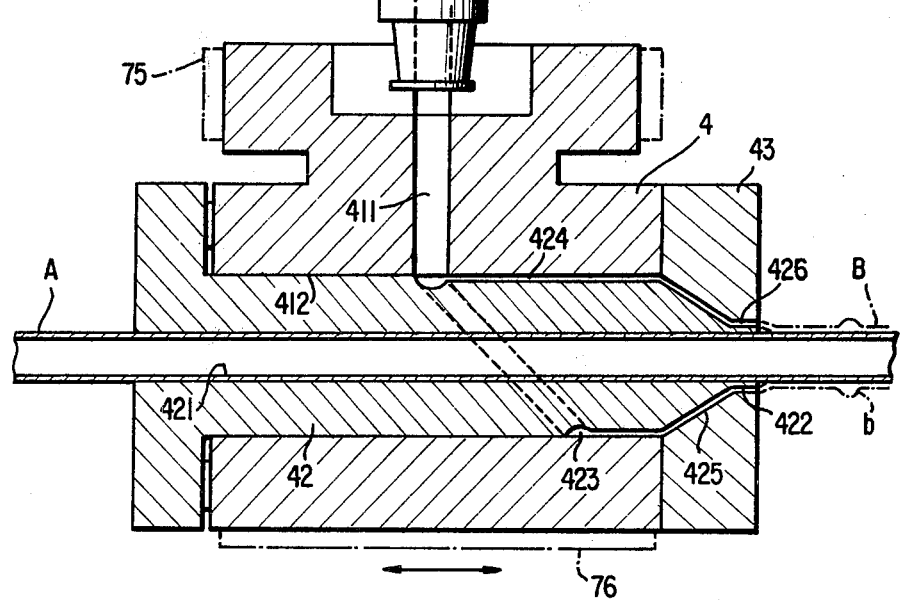

The joint 3 consists of an inner cylinder 31 and an outer cylinder 32 which is slidably and telescopically fitted on the cylinder 31 along the length thereof. The inner cylinder 31 has an intermediate flow passage 311 in its center and is formed with a spherical portion 312 at one end thereof and the spherical portion 312 is rotatably fitted in the adapter 14 through the medium of a holder 33 and a fixed plate 34. The outer cylinder 32 has an intermediate flow passage 322 and an inner-cylinder-admitting hole 321 and is formed with a spherical portion 323 at one end thereof. The spherical portion 323 is rotatably fitted in the cross head die 4 through the medium of a holder 35 and a fixed plate 36, with the inner cylinder 31 being slidably fitted in said inner cylinder admitting hole 321. As a result, the resin outlet 141 in the adapter 14 may be communicated through the intermediate flow passages 311, 322 in the inner cylinder 31 and outer cylinder 32 with the resin inlet 411 in the cross head die 4. In this case, the outer diameter of the outer cylinder 32 may be designed to be the same as that of the inner cylinder 31 where the inner cylinder 31 is connected to the outer cylinder 32 through the annular member 38 which is attached to the outer periphery portion of both cylinders, as shown in FIG. 6A, so that both cylinders slidably move in the annular member. The adapter 14 may be also communicated through a flexible hose 37 with the cross head die 4 as shown in FIG. 6B. It is preferably, however, that the hose 37 afford desired heat and pressure resisting properties and flexibility.

The cross head die 4 is formed with a bore 412 extending at a right angle to the resin inlet 411, while a liner 42 is inserted in the bore 412, and has a die at its tip. The liner 42 includes a guide passage 421 for a steel pipe A in its center. The liner 42 has a tip portion 422 which is cylindrical and has a reduced thickness while a die 43 is fitted around the tip portion 422, thereby defining a cylindrical resin-extruding outlet 426. The cylindrical outlet 426 is communicated with the resin inlet 411 through a channel-like passage 423 defined around the peripheral surface of the liner 42 and a cylindrical passage 424 defined between a side portion of the liner 42 and the cross head die as well as a tapered passage 425 defined between the liner 42 and the cross head die.

The cross head die 4 is supported in a manner to be reciprocated within a given stroke in the direction of the steel pipe A being fed by means of a reciprocating drive means 6. More particularly, a pair of upper and lower guide members 52, 53 are secured through the medium of two or more rods 51 to the adapter 14 while a pair of upper and lower supporting members 44, 45 are secured to the cross head die 4. Two or more guide rollers 54, 55, 56, 57 are fitted on vertical and horizontal shafts extending from the supporting members 44, 45, respectively, and rotatably engage guide grooves 521, 531 in the guide members 52, 53, thereby supporting the cross head die 4 in a manner to be reciprocated within a given stroke in the direction of a steel pipe being fed. Shown at 511 are tubular covers for the rods 51.

Figure 5:
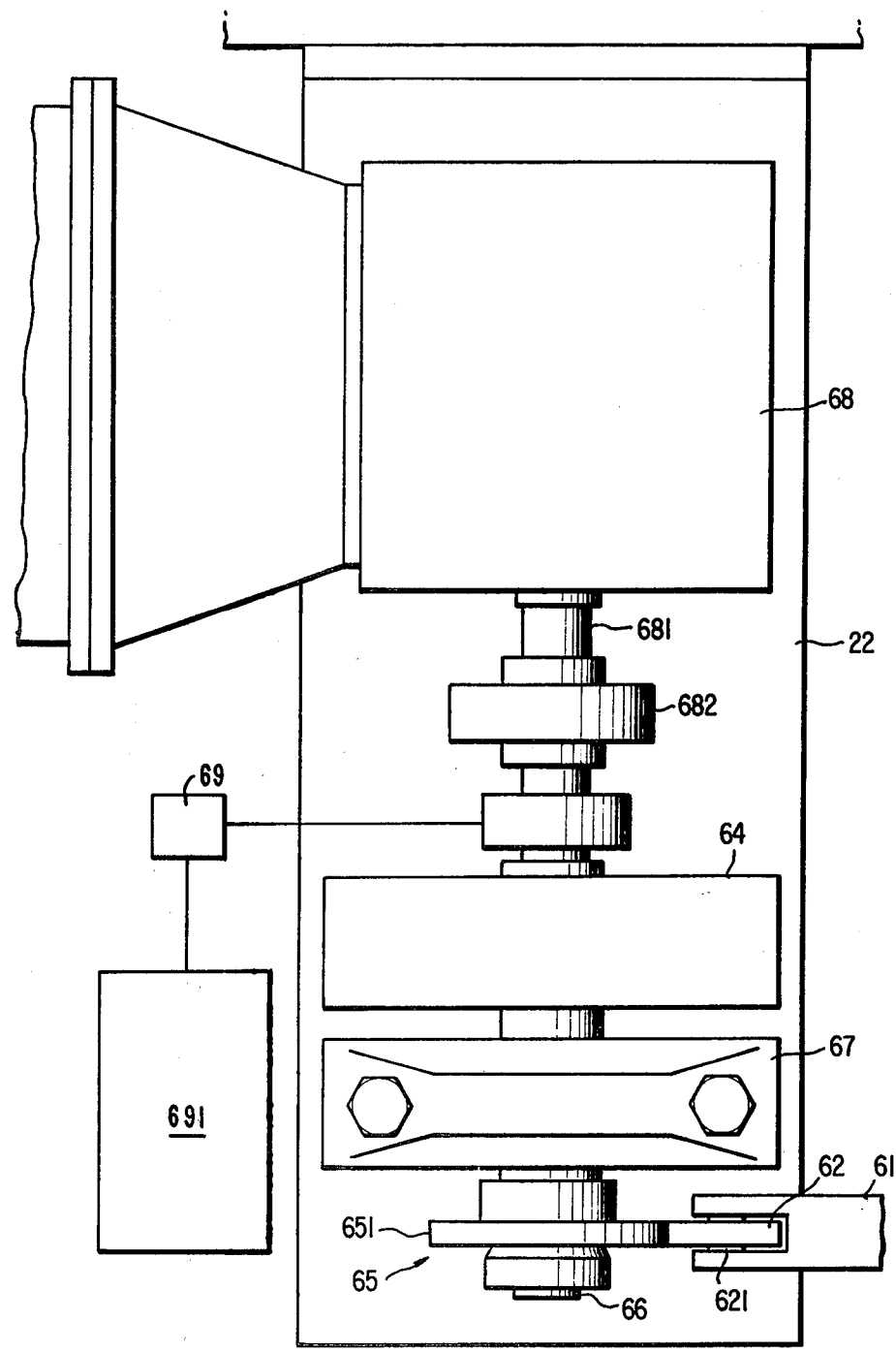
FIG. 5 is a plan view of another embodiment of a reciprocating drive means.

A bar 61 is coupled to the cross head die 4, and has roller 62 which is rotatably fitted on a shaft 621 at the tip thereof. The bar 61 has a projecting shaft 611 at the rear end thereof while the projecting shaft 611 is slidably supported by a bracket 63 which in turn is secured to a frame 631 projecting from the rear end of the guide member 53. A compression spring 64 is a confined between the bracket 63 and the rear end of bar 61. Thus, the spring 64 loads the roller 62 so as to resiliently urge the roller 62 against a cam surface 651 of a cam plate 65. The cam plate 65 is secured to a shaft 66 which, in turn, is supported through the medium of a bearing 67 on a supporting frame 22 positioned in parallel with the fixed frame 21, and coupled through the medium of a coupling 682 to a drive shaft 681 of a geared motor 68 having a gear transmission. As shown in FIG. 5, a clutch brake 69 and a r.p.m. detector 691 are provided on a shaft 681 for interrupting the rotation of the cam plate 65 temporarily.

Band heaters 71, 72, 73, 74, 75, 76 are attached to the outer peripheries of a cylinder 11, adapter 14, inner cylinder 31 and outer cylinder of the expansion-and-universal joint and cross head die 4, respectively.

Figure 7:
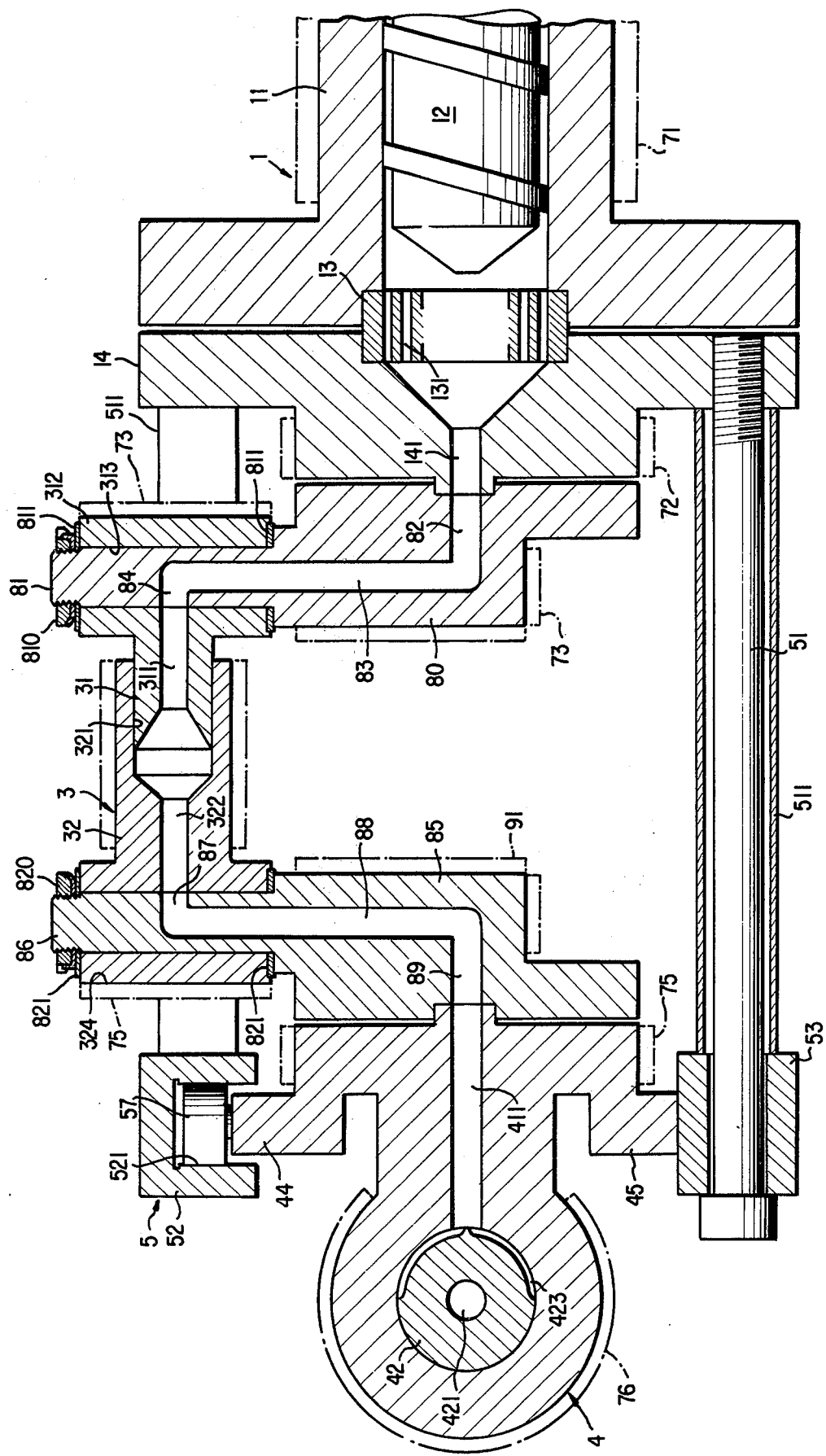

Description has been given of a first embodiment of the invention, in which an expansion-and-universal joint having spherical portions at the opposite ends or flexible hose is provided as resin guide member. FIG. 7 shows another embodiment of the resin guide members affording desired expansibility. Shown at 1 in FIG. 7 is an extruder for a synthetic resin. An adapter 14 is secured to the tip of a cylinder 11 through the medium of a breakerplate 13 having a plurality of through-holes 131 and is provided with a resin extruding outlet 141. Shown at 80 is a first intermediate member which is coupled to the tip of the adapter 14 by fastening means such as bolts and the like, not shown. The first intermediate member 80 is integrally formed with an upright first shaft 81 at the upper end thereof in projecting relation. An intermediate flow passage 83 runs through the first intermediate member 80 and first shaft 81 while a resin inlet 82 of the flow passage 83 is open from the rear surface of the first intermediate member 80 in a given position and communicated with the resin extruding outlet 141. On the other hand, a resin outlet 84 of the flow passage 83 is open divergently from the outer peripheral surface of the first shaft 81. Alternatively, the first intermediate member 80 may be provided separately of first shaft 81 and both members may removably be coupled together.

Shown at 3 is an expansion-and-universal joint which consists of an inner cylinder 31 and an outer cylinder 32 which is slidably fitted on the inner cylinder 31 along the length of the cylinders 31, 32 i.e., in the longitudinal direction. The inner cylinder 31 is provided with an intermediate flow passage 311 in its center and a bearing portion 312 at its one end which portion extends at a right angle to the inner cylinder 31. The first shaft 81 is fitted in a bore 313 defined in the bearing portion 312 so that the inner cylinder is supported in a rotatable manner about the first shaft 81 while the intermediate flow passage 311 is communicated with the resin outlet 84. The outer cylinder 32 has an inner-cylinder-admitting bore 321 and an intermediate flow passage 322 in its center and is formed with a bearing portion 323 at its one end, which portion extends at a right angle to the outer cylinder 32. The inner cylinder 31 is slidably fitted in the inner-cylinder-admitting bore 321 along the length thereof in a manner that both flow passages 311, 322 are communicated with each other, while a second shaft 86 parallel with the first shaft 81 is fitted in a bore 324 defined in the bearing portion 323 so that the outer cylinder 32 is rotatably supported by the second shaft 86.

Shown at 85 is a second intermediate member which is secured to the back surface of the cross head die 4 by means of fastening means such as bolts and nuts. A second shaft 86 is upright on the second intermediate member 85 but parallel with the first shaft 81 while an intermediate flow passage 88 runs through the second intermediate member 85 and second shaft 86. A resin inlet 87 of the flow passage 88 is open divergently from the peripheral surface of the second shaft 86 in a given position into communication with an intermediate passage 322 in the outer cylinder 32 and a resin outlet 89 of the flow passage 88 is open from the front surface of the second intermediate member 85 into communication with a resin inlet 411 provided in the cross head die 4. As a result, the resin extruding outlet 141 in the tip of adapter 14 of the extruder 1 is communicated with a resin inlet 411 in the cross head die 4, and in turn, is communicated through the intermediate flow passage 83 in the first intermediate member 80 and first shaft 81, intermediate flow passages 311, 322 in the inner cylinder 31 and outer cylinder 32 in the expansion-and-universal joint 3, and intermediate flow passage 88 in the second shaft 86 and second intermediate member 85. Meanwhile, the second shaft 86 may be formed separately of the second intermediate member 85 and coupled together removably.

The shape and construction of the first intermediate member 80 and second intermediate member 85, however, are not provided herein in a limitative sense. It is advantageous from a manufacturing viewpoint that the shapes and constuction of the members 80 and 85 are identical.

Shown at 810, 820 are crown nuts for use with the expansion-and-universal joint 3 and the nuts 810 and 820 are threaded on the top ends of the first shaft 81 and second shaft 86, respectively. Shown at 811 and 821 are washers for reducing friction for the expansion-and-universal joint 3, upon rotation thereof, however, bearings may replace the aforesaid washers. The cross head die 4 and reciprocating drive means for the cross head die 4 in this embodiment are the same as those in the preceding embodiment.

In the above-mentioned embodiments, the resin guide members having flexibility or expansibility are described. Another embodiment shown in FIGS. 8 and 9 can also attain the object of the present invention, which is explained hereinafter.

Figure 8:
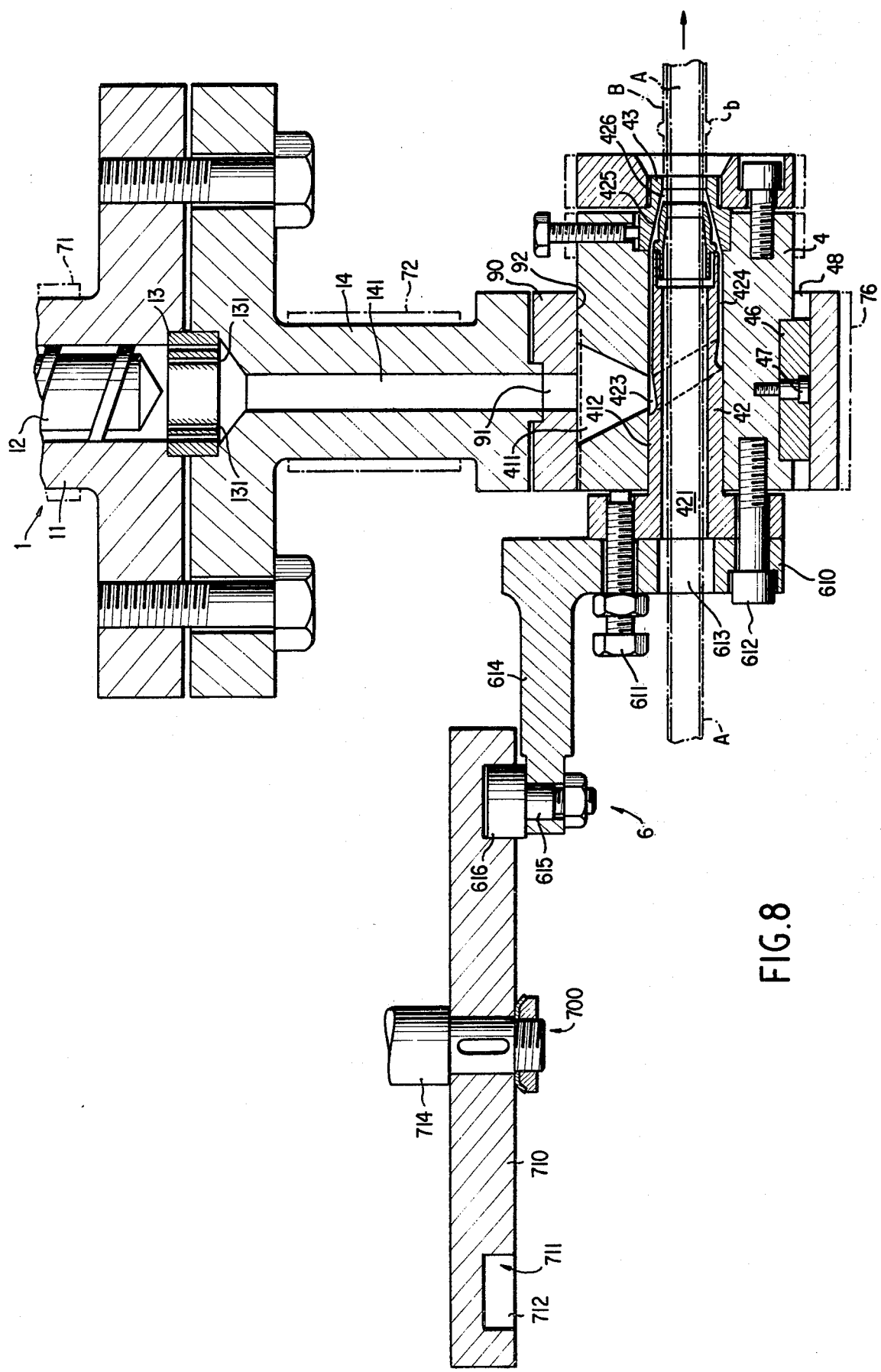
Figure 9:
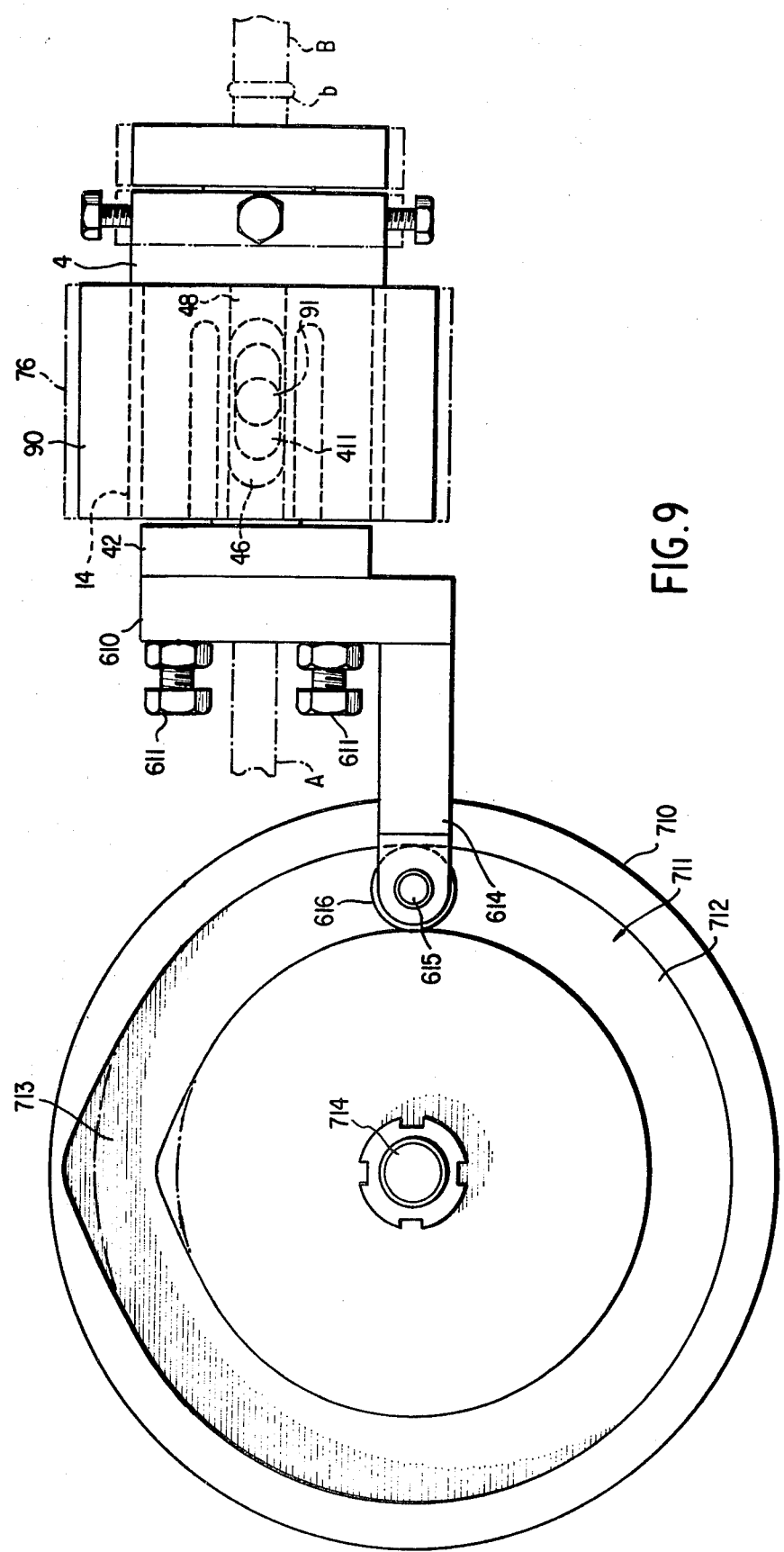
FIG. 9 is a plan view of the apparatus shown in FIG. 8.

Shown at 1 in FIG. 8 is an extruder for extruding a synthetic resin which construction is the same as those in the preceding embodiment. An adapter 14 having a plurality of through-holes 131 is attached to the tip of a cylinder 11. Shown at 90 is an annular, cross-head outer member which is coupled to the tip of the adapter 14 through the medium of two or more attaching bolts (not shown). Provided in the cross-head outer member 90 are a resin flow passage 91 communicating with a resin flow passage 141 provided in the adapter 14 and a supporting hole 92 extending at a right angle to the flow passage 91. The cross head die 4 is slidably supporting hole 92. Shown at 46 is a key which is secured to the outer peripheral surface of the cross head 4 in a given postion by means of a bolt 47. The key 46 is slidably fitted in a key way 48 in the horizontal direction as viewed in the drawing, so that the cross head 4 may slide only in the horizontal direction as viewed in FIG. 8, i.e., in the direction of the steel pipe A being fed, relative to the cross-head outer member 90.

Provided in the cross head die 4 are a resin inlet 411 outwardly divergent and communicating with the flow passage 91 and a hole 412 running at a right a angle of the inlet 411. A liner 42 is inserted into the hole 412. The other arrangement of the cross head die 4 remains the same as that of the preceding embodiment.

Shown at 6 is a drive means for reciprocating the cross head 4. The bracket 610 and the rear end of the liner 42 are coupled to the rear end of cross-head die 4 by means of a locating bolt 611 and a tightening bolt 612. Shown at 613 is a steel pipe inlet provided in the bracket 610 and communicating with the rear end of a steel-pipe guide passage 421 in the liner 42. The bracket 610 is formed with an arm 614 while a roller 616 is rotatably supported by the tip portion of the arm 614 through the medium of a shaft 615. Shown at 700 is a cam mechansim and at 710 is a cam plate which is provided with a cam way 711, with the roller 616 being rotatably fitted in the cam way 711. The cam way 711 includes a circumferential cross-head-stopping groove portion 712 which is of an endless form and a projecting portion 713 which is adapted to move the cross-head die 4 and projects in the radial direction. The cam plate 710 is secured to a drive shaft 714 which is coupled to a drive means such as a motor, not shown. The cross head die 4 is a reciprocated in the cross-head outer member 90 due to the rotation of cam plate 710 while resin B is forced from the extruder 1 into the resin flow passage 141 in the adapter 14 and then in the resin flow passage 91 in the cross head outer member 90 into the resin inlet 411 in the cross head 4.

The operation of the apparatus according to the present invention will now be described with reference to FIGS. 1 to 5.

Initially, a steel pipe A is inserted into the steel pipe guide passage 421, and fed to the right in FIG. 1 at a given speed by feeding and drawing means not shown. In line therewith, coating resin B is molten and kneaded in the extruder and continuously supplied into the cross head die 4 through holes 131 in the breakerplate 13, a resin extruding outlet 141 in the adapter 14, and the intermediate flow passages 311 and 322 in the expansion-and-universal joint 3. Molten resin supplied into the cross head die is forced out from the inlet 411 into the flow passages 423, 424, 425 and then into tubular extruding outlet 426 so as to provide a tubular form for coating or covering the surface of the steel pipe A. In this respect, the inner diameter of tubular resin B thus extruded is larger than the outer diameter of steel pipe A so that there is some clearance remaining therebetween. However, such a clearance may be eliminated by drawing air from the clearance by means of a known vaccum pump, not shown, so that the tubular resin B may cover the surface of a steel pipe tightly.

In the aforesaid coating step, the cross head die 4 reciprocates in the horizontal, opposite directions a' and b' as shown in FIG. 1 so that joints or annular ribs b' may be formed on the surface of the tubular coating B at a given pitch. More specifically, when the cam plate 65 is rotated at a given rotational speed by means of the motor 68, the cross head die 4 is reciprocated within a given stroke in the direction of the steel pipe being fed by means of the roller 62, bar 61 and spring 64. At this time, the cross head die 4 is moved a given distance in an arrow direction a' at the same speed as a steel-pipe-coating speed so that the relative speed of the coating being formed to the pipe may be maintained at zero and, as a result, the resin forced out from the tubular outlet 426 in the die 43 may be built up at the outlet 426 in an amount proportional to the displacement of the cross head die 4, thereby forming an annular rib b or joint. Thereafter, the cross head die 4 is moved in the direction b' to return to its initial position, during which time resin may uniformly coat the surface of the steel pipe over a length proportional to the returning time of the cross head die.

In this manner, synthetic resin B may coat the surface of the steel pipe A which is being continuously fed at a given speed. Thus, when the cross head die 4 is reciprocated within a given stroke by means of the cam plate 65, the relative coating speed of the resin to the steel pipe being fed may be maintained at zero intermittently, so that annular ribs b having a given size may be formed thereon at a given pitch one after another. In this case, the size, shape and rotational speed of the cam plate 65 may be freely selected. The size of rib b may be suitably adjusted by selecting a shape of the cam plate and the stroke of the cross head die 4. In addition, a spacing or pitch of ribs may be suitably adjusted by changing the shape and/or the rotational speed of the cam plate and by selecting the returning time of the cross head.

Furthermore, in a shearing step for a coated steel pipe, there arises a need to partially change a pitch of ribs, so as to avoid the ribs b from being positioned on a cutting portion or in the close vicinity thereof. For this purpose, a detector 691 detects the r.p.m. of the drive shaft 681 for the cam plate to issue an instruction to a clutch brake 69 for intermittently interrupting the rotation of the cam plate 65. In this manner, spacing or pitch of the ribs b formed may be suitably changed so that the ribs may be avoided from being positioned on a cutting portion.

Meanwhile, a drive means 6 for a cross head die in the above embodiment is provided in the form of a cam mechanism. However, as an alternative, a crank mechanism or gear mechanism may be used in place of the cam mechanism. In addition, the guide supporting mechanism as well may be replaced by other mechanism.

As is apparent from the foregoing description, resin may continuously coat the surface of a steel pipe with the steel pipe being fed at a given speed. In addition, annular ribs or joints may be formed in a simple manner so that the feeding of a steel pipe need not be stopped on purpose or slowed down, but may be continued without limitation. Accordingly, production efficiency may be improved with an accompanying increase in yield of products as well as a reduction in manufacturing cost.

Particularly in accordance with the present invention, the extruder may be used in a stationary condition while the cross head die alone is reciprocated, thereby achieving a nullified relative speed of the resin coating being formed with respect to the steep pipe being fed so as to form an annular rib thereon. As a result, the size of a reciprocating drive means for a cross head die may be reduced, the construction thereof may be simplified, and the cost of installation may be reduced. In addition, the size and pitch of ribs may be selected over a wide range with ease.

Obviously numerous modifications and variations of the present invention are possible in light of the above teachings. It is therefore to be understood that within the scope of the appended claims the invention may be practiced otherwise than as specifically described herein. 9n

What is claimed as new and desired to be secured by Letters Patent of the United States is:

1. A steel-pipe coating apparatus for continuously extruding resin for coating said steel pipe therewith including a fixed frame and a cross head die movably mounted with respect to said frame having a resin inlet, an axially extending steel pipe guide passage, and a resin extruding outlet which is open at an exit of said steel pipe guide passage in the form of a tubular clearance surrounding the surface of said steel pipe, which comprises:

an extruder secured to said frame;
a resin extruding outlet in said extruder being communicated through a resin guide member with said resin inlet in said cross head die, thereby introducing a coating resin from said extruder to said cross head die; and
reciprocating drive means for supporting and reciprocably moving said cross head die relative to said extruder within a given stroke in said axial direction of steel-pipe guide passage.

2. A steel-pipe coating apparatus as set forth in claim 1 wherein;
said resin guide member is flexible.

3. A steel-pipe coating apparatus as set forth in claim 2; wherein;
said resin guide member is a hose.

4. A steel-pipe coating apparatus as set forth in claim 1, wherein;
said resin guide member is expansible.

5. A steel-pipe coating apparatus as set forth in claim 4, wherein;
said resin guide member includes: an inner cylinder which comprises an inner cylindrical body and a spherical portion positioned at one end of said inner cylinder body and rotatably mounted at said resin extruding outlet of said extruder; and,
an outer cylinder which comprises an outer cylindrical body slidably fitted on said inner cylindrical body and a spherical portion member positioned at one end of said outer cylindrical body and rotatably mounted at said resin inlet of said cross head die.

6. A steel-pipe coating apparatus as set forth in claim 4, wherein:
said resin guide member comprises:
a first cylinder including a cylindrical body and a spherical portion member positioned at one end of said cylindrical body and rotatably mounted at said resin extruding outlet of said extruder;
a second cylinder including a cylindrical body and a spherical portion member positioned at one end of said cylindrical body and rotatably mounted at said resin inlet of said cross head die; and
an annular member attached to said first and second cylindrical bodies, said first and second cylindrical bodies being slidable in said annular member.

7. A steel-pipe coating apparatus as set forth in claim 4, wherein said resin guide member comprises:
a first intermediate member coupled to said resin extruding outlet in said extruder, and having a first resin passage disposed therein;
a second intermediate member coupled to said resin inlet and said cross head die and having a second resin passage disposed therein; and,
an expansion-and-universal joint for bringing said first and second resin passages in said first and second intermediate members into communication with each other, said joint being rotatably mounted at the connection to said first and second intermediate members.

8. A steel-pipe coating apparatus as set forth in claim 1, wherein said resin guide member comprises:

an adapter coupled to said resin extruding outlet of said extruder and including a resin passage disposed therein; and, an annular body engaging said adapter slidably fitted in and supported by said cross head die, said annular body having a hole which communicates said resin passage in said adapter with said resin inlet in said cross head die.

9. A steel-pipe coating apparatus as set forth in claim 1, wherein;

said reciprocating drive means includes a stop mechanism for temporarily interrupting the reciprocating movement of said cross head die.

10. A steel-pipe coating apparatus as set forth in claim 9 wherein;

said stop mechanism comprises a clutch and brake means.

* * * * *